US008718238B2

(12) United States Patent
Li et al.

(10) Patent No.: US 8,718,238 B2
(45) Date of Patent: May 6, 2014

(54) METHOD AND A SYSTEM FOR IMPLEMENTING A MULTIMEDIA RING BACK TONE SERVICE

(75) Inventors: Ming Li, Shenzhen (CN); Fuxing Zhou, Shenzhen (CN); Zheng Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 518 days.

(21) Appl. No.: 12/682,465

(22) PCT Filed: Oct. 10, 2008

(86) PCT No.: PCT/CN2008/072657
§ 371 (c)(1),
(2), (4) Date: Jul. 12, 2010

(87) PCT Pub. No.: WO2009/049548
PCT Pub. Date: Apr. 23, 2009

(65) Prior Publication Data
US 2010/0296636 A1 Nov. 25, 2010

(30) Foreign Application Priority Data
Oct. 11, 2007 (CN) .......................... 2007 1 0164057

(51) Int. Cl.
*H04M 1/64* (2006.01)
*H04M 11/00* (2006.01)
(52) U.S. Cl.
USPC ........................ 379/87; 379/88.08; 379/88.11
(58) Field of Classification Search
USPC ................. 379/88.01–88.23, 100.14, 201.01, 379/221.01, 114.05, 142.03–142.11; 455/414.1
See application file for complete search history.

(56) References Cited

U.S. PATENT DOCUMENTS 7,839,995 B2 * 11/2010 Batni et al. .................... 379/418
2008/0102800 A1 * 5/2008 Cheng et al. ............... 455/412.2

FOREIGN PATENT DOCUMENTS

| CN | 1852360 A | 10/2006 |
|---|---|---|
| CN | 1905465 A | 1/2007 |
| CN | 101141692 A | 3/2008 |
| CN | 101141700 A | 3/2008 |
| KR | 20070042053 A | 4/2007 |

OTHER PUBLICATIONS

International Search Report dated Dec. 25, 2008, issued in International Application No. PCT/CN2008/072657.

* cited by examiner

*Primary Examiner* — Mohammad Islam
(74) *Attorney, Agent, or Firm* — Bright IP Law Offices

(57) ABSTRACT

The present invention discloses a method and a system for implementing an MRBT service, comprising: Step S102, a calling terminal initiates a call to a called terminal which has registered a multimedia MRBT service, and triggers an MRBT service module of the MRBT Application Server according to service template information subscribed in a Home Subscriber Server by the called terminal; Step S104, the MRBT service module calls the called terminal through an IMS network, and performs query on an MRBT platform according to the call related information to obtain the MRBT information to be played for the calling terminal; and Step S106, the calling terminal performs negotiation with the MRBT platform and performs negotiation with the called terminal, and the MRBT platform plays the MRBT information inquired by the MRBT service module according to the call related information to the calling terminal on condition that the negotiations are successful. In this way, the problem in the relative art that the MRBT service can not be implemented in the IMS network is solved.

9 Claims, 3 Drawing Sheets

METHOD AND A SYSTEM FOR IMPLEMENTING A MULTIMEDIA RING BACK TONE SERVICE

FIELD OF THE INVENTION

The present invention relates to communication field, and in particular to a method and a system for implementing a Multimedia Ring Back Tone (MRBT) service in the Internet Protocol (IP) Multimedia Subsystem (IMS) network of the 3rd generation mobile communication system.

BACKGROUND OF THE INVENTION

With the development of the telecommunication technology, individualized telecommunication services emerge as required. The coloring ring back tone service, as an individualized value-added service, has been very popular to the users.

In this kind of service, if a called terminal has registered the customized caller ring back tone service and preconfigured a caller ring back tone, when a calling terminal calls the called terminal, before the called terminal answers the call, the calling terminal will hear an individualized customized caller ring back tone, instead of the common caller ring back tone of monotone "toot . . . toot . . . ".

Further, with the deployment and the application of the IMS network of the 3rd generation mobile communication system, in order to satisfy the ever-increasing demand of various clients on telecommunication services and improve the serving functions of the IMS, providing users in the network with various individualized multimedia services has become an urgent matter. During the call connection process of the current IMS communication system, before the called terminal answers the call, the calling terminal cannot play the MRBT preconfigured by the called terminal to replace the conventional common monotone caller ring back tone, which obviously cannot satisfy the current ever-increasing demand on the multimedia services.

SUMMARY OF THE INVENTION

The present invention is made in consideration of the problem in the related art that a calling terminal of the IMS network can only play a common caller ring back tone when making a call, and thus, the main object of the present invention is to provide an implementation solution for the MRBT service.

According to the embodiment of the present invention, a method for implementing an MRBT service is provided.

The method includes: Step S102, a calling terminal initiates a call to a called terminal which has registered an MRBT service, and triggers an MRBT service module of an MRBT Application Server according to service template information subscribed in a Home Subscriber Server by the called terminal; S104, the MRBT service module calls the called terminal through an IP Multimedia Subsystem network, and performs query on a MRBT platform according to the call related information to obtain the MRBT information to be played for the calling terminal; and S106, the calling terminal performs negotiation with the MRBT platform and performs negotiation with the called terminal, and the MRBT platform plays the MRBT information inquired by the MRBT service module to the calling terminal according to the call related information in the condition that the negotiations are successful.

Wherein, in Step S106, the calling terminal performs an early session negotiation with the MRBT platform using the Session Description Protocol, and the early session negotiation is initiated by the calling terminal. In addition, in Step S106, the calling terminal performs a media negotiation with the called terminal using the Session Description Protocol, and the media negotiation is initiated by the calling terminal.

In addition, the MRBT platform plays the MRBT information to the calling terminal via the real-time transmission protocol.

In addition, in the method, the call related information includes the calling number of the calling terminal, the calling number of the called terminal, the date and the time of initiating the call, and a playing strategy of the called terminal.

Further, the MRBT information can be video information and/or audio information.

In addition, after Step S106, the method can further include: the called terminal answers the calling terminal and stops playing the MRBT information to the calling terminal.

According to the embodiment of the present invention, a system for implementing an MRBT service is provided.

The system comprises: a calling terminal, configured to initiate a call to a called terminal which has registered an MRBT service, to trigger an MRBT service module of an MRBT Application Server according to service template information subscribed in a Home Subscriber Server by the called terminal, and to perform negotiation with an MRBT platform and performing negotiation with the called terminal; the MRBT service module, configured to call the called terminal through an IP Multimedia Subsystem network, and to perform query on the MRBT platform according to call related information to obtain the MRBT information to be played for the calling terminal; the MRBT platform, configured to play the MRBT information inquired by the MRBT service module to the calling terminal according to the call related information in the condition that the negotiations are successful.

By means of the above technical solution of the present invention, without changing the current devices, a multimedia called MRBT service can be performed on the MRBT Application Server (AS), so that users in the IMS network can conveniently enjoy the individualized MRBT services with strong functions, thereby solving the problem in the related art that the MRBT service cannot be implemented in the IMS network.

BRIEF DESCRIPTION OF THE DRAWINGS

The drawings illustrated here provide a further understanding of the present invention and form a part of the present application. The exemplary embodiments of the present invention and the description thereof are used to explain the present invention without unduly limiting the scope of the present invention, wherein.

DETAILED DESCRIPTION OF EMBODIMENTS

Function Overview

In view of the problem in the related art that the MRBT cannot be implemented in the IMS network, the present invention provides the following solution: when a calling terminal initiates a call to a called terminal which has registered an MRBT service, an MRBT service module of the MRBT Application Server will be triggered, according to the service template information subscribed in a Home Subscriber Server by the called terminal, the MRBT service module performs query to obtain the MRBT information to be played for the calling terminal, then the calling terminal performs negotiation with an MRBT platform and performs negotiation with the called terminal, and the MRBT information inquired by the MRBT service module will be played to the calling terminal in the condition that the negotiations are successful, so that the MRBT service is implemented in the IMS network.

The present invention will be described hereinafter in detail in conjunction with the drawings thereof.

In the embodiment of the present invention, a method for implementing an MRBT service in the IMS network is provided. The played multimedia information can be audio data and/or video data (for example, individualized multimedia information such as music, video, text, and combinations thereof), a playing strategy can be configured by the called terminal, for example, the playing strategy can be configured as any individualized playing strategy such as random play, play based on the calling number of the calling terminal, play based on a specific period of time, and combinations thereof. The embodiment of the present invention will be described hereinafter in detail.

Figure 1:
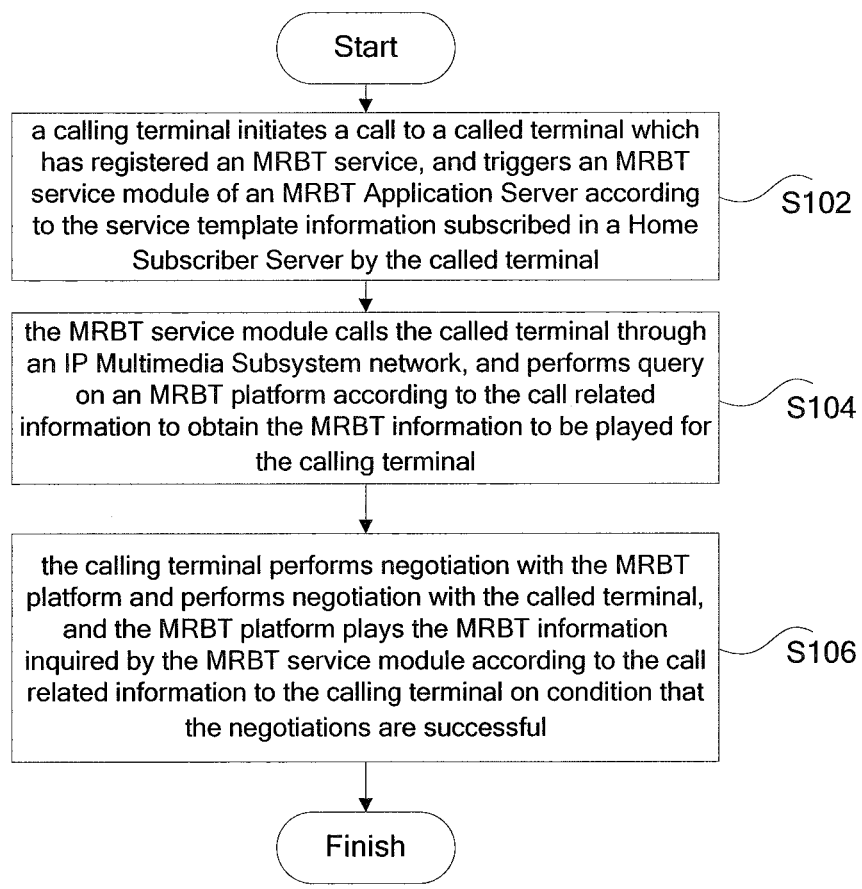
FIG. 1 is a flow chart of the method for implementing an MRBT service according to the embodiment of the present invention.

As shown in FIG. 1, the method for implementing an MRBT service according to this embodiment comprises: Step S102, a calling terminal initiates a call to a called terminal which has registered an MRBT service, and triggers an MRBT service module (not shown) of the MRBT Application Server (MRBT AS) according to the service template information subscribed in a Home Subscriber Server by the called terminal; Step S104, the MRBT service module calls the called terminal through an IMS network, and performs query on an MRBT platform according to the call related information of to obtain the MRBT information to be played for the calling terminal; and Step S106, the calling terminal performs negotiation with the MRBT platform and performs negotiation with the called terminal, and the MRBT platform plays the MRBT information inquired by the MRBT service module according to the call related information to the calling terminal on condition that the negotiations are successful.

Wherein, in the Step S106, the calling terminal performs an early session negotiation with the MRBT platform using the Session Description Protocol (SDP), and the early session negotiation is initiated by the calling terminal.

In addition, in the Step S106, the calling terminal performs a media negotiation with the called terminal using the Session Description Protocol, and the media negotiation is initiated by the calling terminal. In addition, in the Step S106, the MRBT platform plays the MRBT information to the calling terminal via the real-time transmission protocol (RTP).

In addition, in the method, the call related information can comprise the number of the calling terminal, the number of the called terminal, the date and the time of initiating the call, and the playing strategy of the called terminal.

In addition, subsequent to the Step S106, the method can further comprise: the called terminal answers the calling terminal and playing the MRBT information (audio and/or video information) to the calling terminal is stopped.

In addition, both the calling terminal and the called terminal are IP Multimedia Subsystem terminals of the $3^{rd}$ mobile communication system and both store their numbers at the Home Subscriber Server (HSS) of the IMS core network, and also, the called terminal subscribes the MRBT service at the HSS and opens a called MRBT service at an MRBT center. Preferably, the calling terminal and the called terminal can be soft terminals (Soft Phone) supporting the Session Initiation Protocol (SIP).

Figure 2:
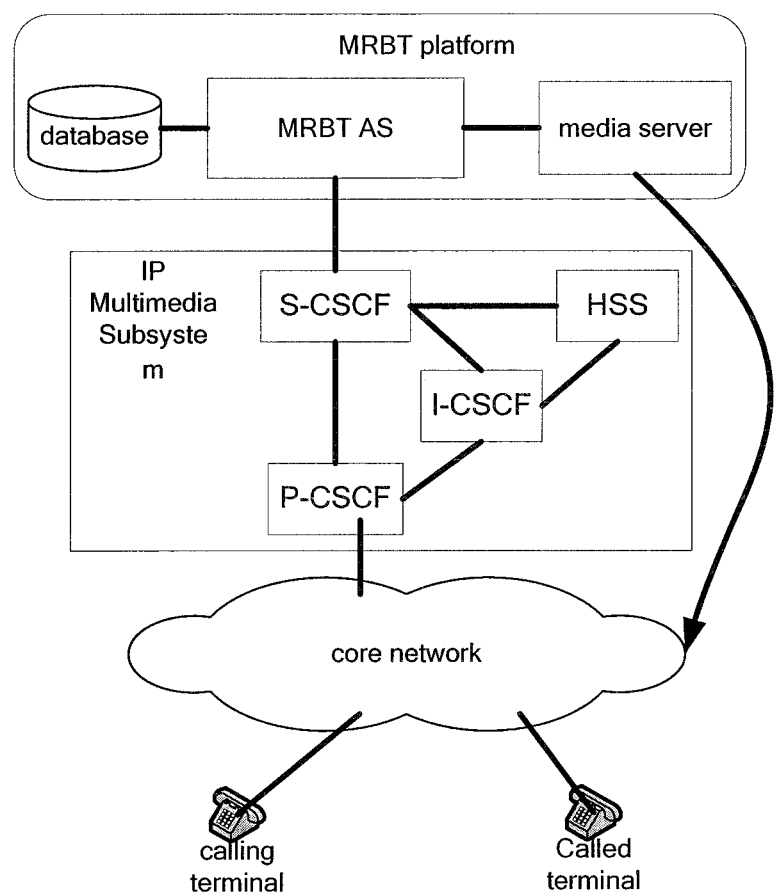
FIG. 2 is a block diagram of the system of the method for implementing an MRBT service according to the embodiment of the present invention.

FIG. 2 illustrates a block diagram of the networking of an MRBT service system in the IMS network. As shown in FIG. 2, the system comprises a calling terminal, an IMS core network (including a Call/Session Control Function (CSCF) server, a HSS, and etc.), an MRBT platform (including an AS, a Media Server (MS), a Database (DB), and etc.), and a called terminal.

The MRBT AS executes an MRBT service logic, and interacts with the IMS core network and the MS using the SIP; the Database stores the system information and the user information of the MRBT service; the MS stores audio media and video media, and preferably, the calling terminal uses the SIP protocol to interact with the MRBT AS, and the MRBT AS uses the Real-Time Transmission Protocol (RTP) packet to play audio or video data to the calling terminal.

In order to simplify the description, it is assumed that the calling terminal and the called terminal belong to a same HSS and a same serving CSCF. In this situation, the following portions are comprised: a Soft Phone, a Proxy CSCF (P-CSCF), an Inquiry CSCF (I-CSCF), a Serving CSCF (S-CSCF), a Home Subscriber Server, an MRBT AS, a database server DB, and an MS. For communication connection, various network elements are connected together via a TCP/IP network, and the Soft Phone interacts with the P-CSCF using the SIP protocol, the three network elements of the P-CSCF, the I-CSCF and the S-CSCF interact with each other using the SIP protocol, either of the two network elements of the I-CSCF and the S-CSCF interacts with the HSS using Diameter protocol, the S-CSCF interacts with the MRBT AS using the SIP protocol, the MRBT AS interacts with the MS using the SIP protocol, the MRBT AS performs the data access and the data modification with the DB via an internally defined interface, and the MS interacts with the calling terminal using the RTP protocol, so as to play the multimedia information.

Figure 3:
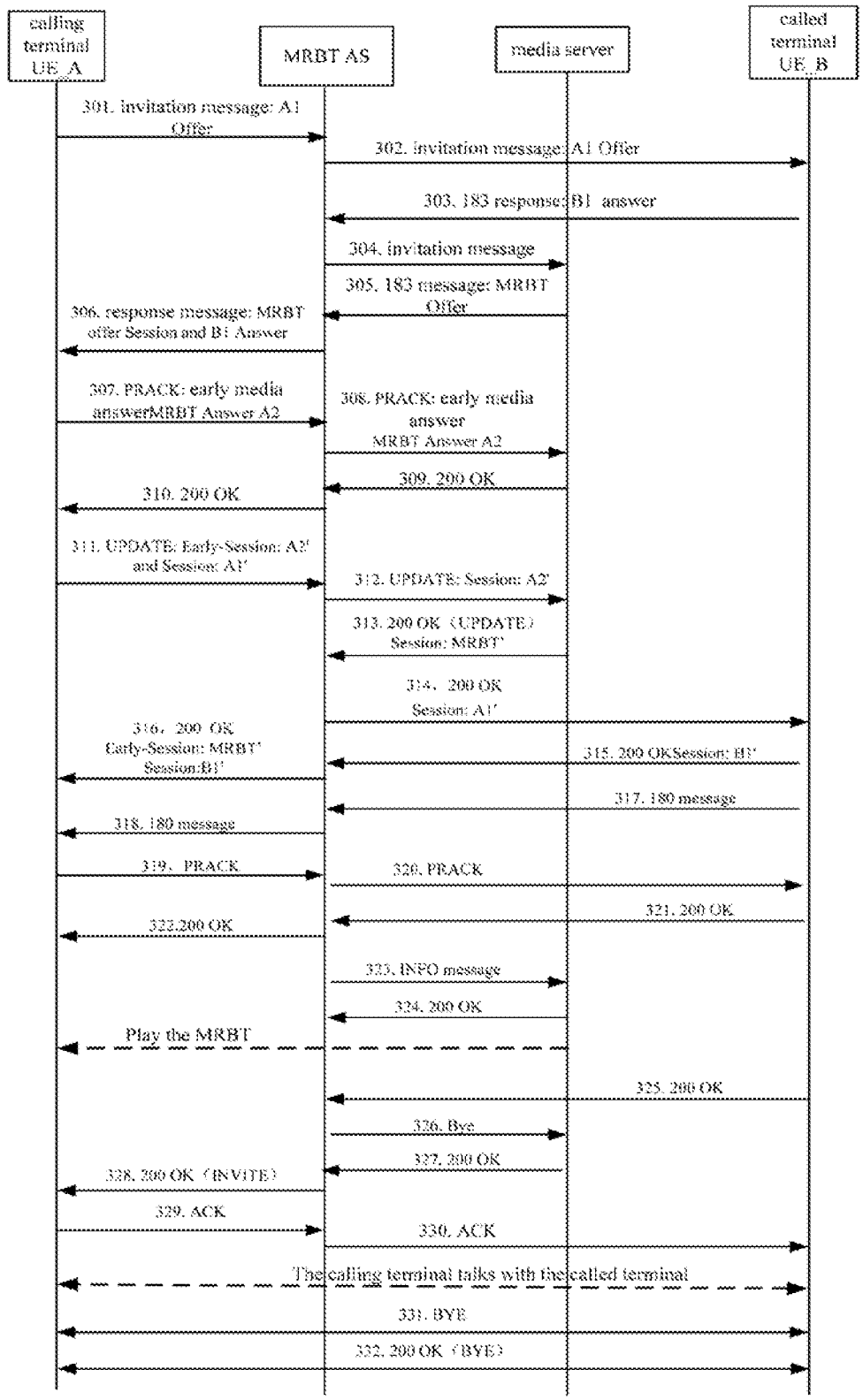
FIG. 3 is a signaling flow chart of implementing the MRBT service based on the system in FIG. 2.

The MRBT service module is loaded on and runs on the MRBT AS, which acts as the core portion for implementing the MRBT service and realizes the following functions: inquiring the MRBT that needs to be played for the call according to the calling number of the calling terminal, the calling number of the called terminal, the current date, the current time, and the playing strategy set by the called terminal; and according to the flow shown in FIG. 3, completing the early session negotiation between the calling terminal and the MS, and controlling the MS to start and stop playing media to the calling terminal.

FIG. 3 is a signaling flow chart of the processing in which the method for implementing an MRBT service according to the embodiment is applied to the system shown in FIG. 2.

As shown in FIG. 3, it can specifically comprise the following processing:

step 301 to step 303, the calling terminal (UE_A) dials the calling number of the called terminal (UE_B), the calling terminal sends an SIP INVITE request to the IMS network for calling the called terminal, the IMS network, after detecting that the called terminal has subscribed the called MRBT service, initiates the invitation message to the called MRBT AS, that is, after omitting the signaling transfer in the IMS core network portion, it is reflected in the signaling flow as an invitation message sent by the calling terminal to the MRBT AS, and at the same time, the support head field of an SIP message includes an identifier of supporting an early session ability and carries the media ability A1 of the calling terminal; after receiving the request, the called terminal returns a 183 response, which includes the session SDP answer B1;

step 304 to step 305, the MRBT AS initiates the invitation message to the MS, and the message does not include SDP information. The MS returns a 183 message after receiving the request and carries in the SDP the MRBT media (MRBT Offer) supported by itself;

step 306, the MRBT AS returns the 183 response to the calling terminal, and the response message includes the session SDP answer B1 returned by the called terminal and the early-session SDP offer MRBT returned by the MS;

step 307 to step 310, the calling terminal sends PRACK and confirms that it has received the 183 response, and carries the early-session SDP answer MRBT and session answer A2 in the PRACK; after receiving the early media answer, the MS returns a 200 OK message;

step 311, the calling terminal sends an UPDATE message, which indicates that the resources at the calling side has been reserved, and the UPDATE message carries Early Session A2' and Session A1';

step 312 to step 313, the MRBT AS sends the UPDATE message to the MS and carries SDP A2' in the message; the MS returns the 200 OK message which carries MRBT';

step 314 to step 315, the MRBT AS sends the 200 OK message to the called terminal, and the message carries the Session A1'; the called terminal returns the 200 OK message which carries Session B1';

step 316, the MRBT AS sends the 200 OK message to the calling terminal, and the message carries Early Session MRBT' and Session B1';

step 317 to step 322, the called terminal sends a 180 message to the MRBT AS, and the MRBT forwards the message to the calling terminal, and the calling terminal forwards the PRACK to the called terminal via the MRBT AS, and the called terminal returns the 200 OK message to the calling terminal via the MRBT AS;

step 323 to step 324, the MRBT AS sends an INFO message to the MS after receiving the 180 message, to notify the MS to play the MRBT, and the calling terminal enjoys the multimedia MRBT;

step 325, the called terminal answers the call and sends a 200 OK message;

step 326 to step 327, after receiving the answer from the called terminal, the MRBT AS sends a BYE message to the MS to stop playing the MRBT information;

step 328 to step 330, the MRBT AS sends a 200 OK message to the calling terminal, the calling terminal sends an ACK message to the called terminal, and then the calling terminal talks with the called terminal; and step 331 to step 332, when either party of the calling terminal and the called terminal hangs off, it sends a BYE message, and the talk between the calling terminal and the called terminal is terminated.

All in all, the present invention, without changing the current devices, runs a multimedia called MRBT service on the MRBT AS, so that users in the IMS network can conveniently enjoy the individualized MRBT services with strong functions, thereby solving the problem in the related art that the MRBT service cannot be implemented in the IMS network.

Above description is only to illustrate the preferable embodiments of the invention but not to limit the present invention. Various alterations and changes to the present invention are apparent to those skilled in the art. The scope defined in claims shall comprise any modifications, equivalent substitutions, and improvements within the spirit and principle of the present invention.

What is claimed is:

1. A method for implementing an MRBT service, comprising:
   a calling terminal initiating a call to a called terminal which has registered an MRBT service, and triggering an MRBT service module of an MRBT Application Server according to service template information subscribed in a Home Subscriber Server by the called terminal;
   the MRBT service module calling the called terminal through an IP Multimedia Subsystem network, and performing query on an MRBT platform according to call related information to obtain the MRBT information to be played for the calling terminal; and
   the calling terminal performing negotiation with the MRBT platform and performing negotiation with the called terminal, and the MRBT platform playing the MRBT information inquired by the MRBT service module to the calling terminal according to the call related information in the condition that the negotiations are successful, wherein the calling terminal performs an early session negotiation with the MRBT platform using the Session Description Protocol and the early session negotiation is initiated by the calling terminal, wherein the calling terminal performs a media negotiation with the called terminal using the Session Description Protocol and the media negotiation is initiated by the calling terminal.

2. The method for implementing an MRBT service according to claim 1, wherein, the MRBT platform plays the MRBT information to the calling terminal via the real-time transmission protocol.

3. The method for implementing an MRBT service according to claim 1, wherein, the call related information comprises: the calling number of the calling terminal, the calling, number of the called terminal, the date and the time of initiating the call, and a playing strategy of the called terminal.

4. The method for implementing an MRBT service according to claim 1, wherein, the MRBT information is video information and/or audio information.

5. The method for implementing an MRBT service according to claim 1, further comprising: the called terminal answering the calling terminal and the MRBT platform stopping playing the MRBT information to the calling terminal.

6. The method for implementing an MRBT service according to claim 2, wherein, the call related information comprises: the calling number of the calling terminal, the calling number of the called terminal, the date and the time of initiating the call, and a playing strategy of the called terminal.

7. The method for implementing an MRBT service according to claim 2, wherein, the MRBT information is video information and/or audio information.

8. The method for implementing an MRBT service according to claim 2, further comprising: the called terminal answering the calling terminal and the MRBT platform stopping playing the MRBT information to the calling terminal.

9. A system for implementing an MRBT service, comprising:
   a calling terminal, configured to initiate a call to a called terminal which has registered an MRBT service, to trigger an MRBT service module of an MRBT Application Server according to service template information subscribed in a Home Subscriber Server by the called terminal, and to perform negotiation with an MRBT platform and performing negotiation with the called terminal, wherein the calling terminal performs an early session negotiation with the MRBT platform using the Session Description Protocol and the early session negotiation is initiated by the calling terminal, wherein the calling terminal performs a media negotiation with the called terminal using the Session Description Protocol and the media negotiation is initiated by the calling terminal;

the MRBT service module, configured to call the called terminal through an IP Multimedia Subsystem network, and to perform query on the MRBT platform according, to call related information to obtain the MRBT information to be played for the calling terminal;

the MRBT platform; configured to play the MRBT information inquired by the MRBT service module to the calling terminal according to the call related information in the condition that the negotiations are successful.

\* \* \* \* \*